United States Patent
Gentit

[15] 3,637,507

[45] Jan. 25, 1972

[54] AIRCRAFT HYDRAULIC FLUID AND METHOD OF CONTROLLING ACID BUILDUP THEREIN WITH ACID ACCEPTOR

[72] Inventor: William F. Gentit, Mohegan Lake, N.Y.

[73] Assignee: Stauffer Chemical Company, New York, N.Y.

[22] Filed: Feb. 12, 1968

[21] Appl. No.: 704,514

[52] U.S. Cl. ................................252/78, 252/73, 252/75, 252/77, 252/79, 252/396, 252/407
[51] Int. Cl. ....................C09k 3/02, C10m 3/20, C10m 3/40
[58] Field of Search..................252/73, 75, 77, 78, 388, 396, 252/399, 407; 260/348 C

[56] References Cited

UNITED STATES PATENTS

| | | | |
|---|---|---|---|
| 2,552,084 | 5/1951 | Bishop et al. | 252/73 X |
| 2,636,861 | 4/1953 | Watson | 252/78 |
| 2,862,886 | 12/1958 | Davies et al. | 252/78 |
| 3,018,294 | 1/1962 | Phillips et al. | 252/73 X |
| 3,078,271 | 2/1963 | Groote et al. | 252/77 X |
| 3,169,923 | 2/1965 | Guarnaccio et al. | 252/75 X |
| 3,420,779 | 1/1969 | Emblem et al. | 252/75 |
| 3,487,020 | 12/1969 | Peeler et al. | 252/78 |
| 2,716,123 | 8/1955 | Frostick et al. | 260/348 C |
| 2,786,067 | 3/1957 | Frostick et al. | 260/348 C |
| 3,334,054 | 8/1967 | Howard et al. | 252/390 |
| 3,496,107 | 2/1970 | Lima et al. | 252/49.9 |

FOREIGN PATENTS OR APPLICATIONS

| | | | |
|---|---|---|---|
| 687,539 | 5/1964 | Canada | 260/348.3 |

Primary Examiner—Richard D. Lovering
Attorney—Wayne C. Jaeschke and Daniel S. Ortiz

[57] ABSTRACT

An aircraft hydraulic fluid comprising (1) a base stock material selected from the group consisting of esters of an acid of phosphorus, amides of an acid of phosphorus and mixtures thereof, and (2) an acid acceptor consisting of a 3,4-epoxycycloalkyl 3,4-epoxycycloalkyl carboxylate. By incorporating about 0.1 to about 10 percent by weight of said acid acceptor in said hydraulic fluid, acid buildup therein is controlled.

15 Claims, No Drawings

AIRCRAFT HYDRAULIC FLUID AND METHOD OF CONTROLLING ACID BUILDUP THEREIN WITH ACID ACCEPTOR

BACKGROUND OF THE INVENTION

A number of fluids are known which are intended for use to transmit power in hydraulic systems including some fluids intended for use in the hydraulic systems of aircraft. However, the hydraulic power systems of aircraft for operating various mechanisms of an airplane impose stringent requirements on the hydraulic fluid used. Not only must the hydraulic fluid for aircraft meet stringent functional and use requirements, but in addition such fluid should be sufficiently nonflammable to satisfy aircraft requirements for fire resistance. The viscosity characteristics of this fluid must be such that it may be used over a wide temperature range; that is, adequate viscosity at high temperatures, low viscosity at low temperatures and a low rate of change of viscosity with temperature. Its pour point should be low. Its volatility should be low at elevated temperatures of use and the volatility should be balanced; that is, selective evaporation or volatilization of any important component should not take place at high temperatures of use. It must possess sufficient lubricity and mechanical stability to enable it to be used in hydraulic systems of aircraft which are exceedingly severe on the fluid used. It should be chemically stable to resist such chemical reactions as oxidation, thermal degradation, etc., so that it will remain stable under conditions of use against loss of desired characteristics, due to high and sudden changes of pressure, temperature, high tensile stresses, and contact with various metals which may be, for example, aluminum, bronze, steels, etc. It should also not deteriorate the gaskets and packing of the hydraulic system. It must not adversely affect the materials of which the system is constructed, and in the event of a leak, should not adversely affect the various parts of the airplane with which it may accidentally come in contact. It should not be toxic or harmful to personnel who may come in contact with it. Furthermore, in addition to all such requisites for aircraft use, the fluids must be sufficiently nonflammable to meet aircraft requirements.

Various hydraulic fluid mixtures have been suggested. Light petroleum oil fractions to which suitable pour point depressants, viscosity index improvers, rust inhibitors, corrosion inhibitors, etc., have been added, are among the best so far proposed and these have been used somewhat extensively as aircraft hydraulic fluids.

These materials, however, exhibit a high degree of acid buildup during use. In the event that this acid buildup becomes too excessive, the base stock materials will break down and will lose their physical properties of viscosity, etc. This acid buildup is thought to be due to shearing action of the various mechanical components on the fluid material to release acid ends on the additives within the base stock material. If the acidity of the base stock fluid is allowed to become excessive, i.e., the acid will attack the metal parts within the hydraulic system that are exposed to the fluids. In order to combat this acid attack, corrosion inhibitors are added to the functional fluid compositions. One such corrosion inhibitor is described and claimed in U.S. Pat. No. 2,636,861, which includes a combination of specific epoxy compositions with a sulfur containing organic compound. The function of these corrosion inhibitors is to coat the exposed metal with a thin film in such a manner so as to not allow the acid within the fluid to attack the metals. This approach to protecting the exposed metal parts has not been notably successful since the high acid buildup in fact causes corrosion of the metal in addition to breaking down the chemical composition of the functional fluid material so as to require frequent drainage of the system and replacement with new functional fluid compositions.

BRIEF DESCRIPTION OF THE INVENTION

It has been discovered that improved acid stability is provided to a functional fluid material when an epoxy composition is added thereto. The epoxy composition can be exemplified by the following formula:

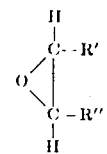

wherein R' can be hydrogen, an alkyl group having from one to 500 carbon atoms, a substituted alkyl group having from one 500 carbon atoms, an aryl group having from nine to 350 carbon atoms, a substituted aryl group having from nine to 350 carbon atoms, an ester radical, a phenoxy radical, an ether radical, a substituted epoxide; R'' can be hydrogen, an alkyl group having from one to 500 carbon atoms, a substituted alkyl group having from one to 500 carbon atoms, an aryl group having from nine to 350 carbon atoms, a substituted aryl group having from nine to 350 carbon atoms, an ester radical, a phenoxy radical, an ether radical, a substituted epoxide; R' and R'' when taken together can be a cyclic group, a substituted cyclic group, or a substituted cyclic epoxide group.

DETAILED DESCRIPTION OF THE INVENTION

In the practice of the present invention functional fluids, to which the epoxy compositions of the present invention can be added, are referred to as base stocks. They include, but are not limited to, esters and amides of an acid of phosphorus, mineral oil and synthetic hydrocarbon oil base stocks, hydrocarbyl silicates, silicones, aromatic ether and thioether compounds, chlorinated biphenyl, monoesters, dicarboxylic acid esters and esters of polyhydric compounds. The concentration of the epoxy composition in the functional fluid is adjusted in terms of the particular system and the functional fluid which is utilized in this system to provide functional fluid compositions of this invention which contain additive amounts of epoxy material sufficient to inhibit acid buildup. Thus, it has been found that the additive response, that is, the concentration of epoxy composition required to inhibit and control acid buildup, of a base stock varies according to the base stock or blends of base stocks. Since the epoxy composition is incorporated in the fluid at levels sufficient to inhibit acid buildup and whereas fluid properties can be altered by the incorporation of any foreign element, it has generally been found that preferred additive levels of epoxy compositions are from about 0.10 weight percent to about 5.0 weight percent, although 10.0 weight percent additive concentration is effective and contemplated within the scope of this invention. Thus, included in the present invention are compositions comprising a functional fluid and an epoxy material, in a concentration sufficient to control and inhibit acid buildup. The functional fluid composition of this invention can be compounded in any manner known to those skilled in the art for incorporation of an additive into a base stock, as for example by adding the epoxy composition to the base stock with stirring until a homogeneous fluid composition is obtained.

Epoxy compositions as exemplified by the above general formula, that can be employed with the present invention are those well-known epoxy resins which are soluble within the base stock employed as functional fluids. Specific examples of the epoxy compositions are the compositions as exemplified by the following formula:

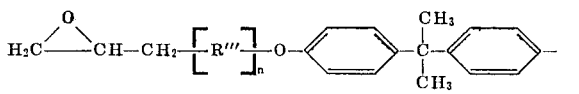

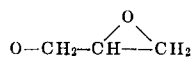

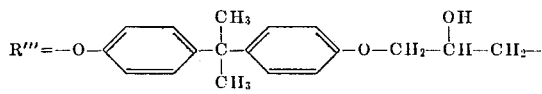

wherein n may be an integer from 0 up to about 18.

Another specific resin class are the well-known novolac epoxy resins as exemplified by the following formula:

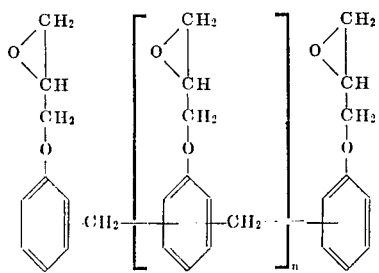

wherein the average value of n is from about 0.1 up to about 2.5. Additionally, the aromatic diglycidyl ethers have the formula:

Structure

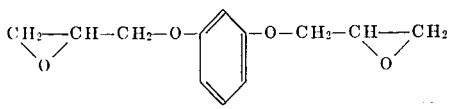

can be employed with this invention. In its preferred form, the epoxy resin as exemplified by 3,4-epoxycycloalkyl, 3,4-epoxycycloalkyl carboxylate is preferred. Representative of this class of epoxy resins is 3,4-epoxycyclohexylmethyl, 3,4-epoxycyclohexane carboxylate having the following formula:

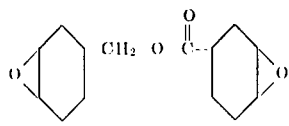

The above-described epoxy resin compositions are well-known chemical entities in the art. Thus, the preparation and molecular structures thereof are well documented in the art.

The functional fluid compositions that are suitable for use as base stock materials with the present invention can be esters and amides of an acid of phosphorus which can be represented by the structure:

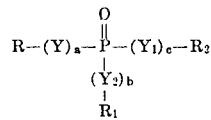

wherein Y is selected from the group consisting of oxygen, sulfur and

; $Y_1$ is selected from the group consisting of oxygen, sulfur and

and $Y_2$ is selected from the group consisting of oxygen, sulfur and

; R, $R_1$, $R_2$, $R_3$, $R_4$ and $R_5$ are each selected from the group consisting of alkyl, aryl, substituted aryl and substituted alkyl wherein R, $R_1$, $R_2$, $R_3$, $R_4$ and $R_5$ each can be identical or different with respect to any other radical and a, b and c are whole numbers having a value of 0 to 1 and the sum of $a+b+c$ is from 1 to 3.

Typical examples of alkyl radicals are as follows: methyl, ethyl, normal propyl, isopropyl, normal butyl, isobutyl, secondary butyl, tertiary butyl, normal amyl, isoamyl, 2-methyl-butyl, 2,2-dimethyl propyl, 1-methyl butyl, diethylmethyl, 1,2-dimethyl propyl, tertiary amyl, normal hexyl, 1-methylamyl, 1-ethyl butyl, 1,2,2-trimethyl propyl, 3,3-dimethyl butyl, 1,1,2-trimethyl propyl, 2-methyl amyl, 1,1-dimethyl butyl, 1-ethyl 2-methyl propyl, 1,3-dimethyl butyl, isohexyl, 3-methyl-amyl, 1,2-dimethyl butyl, 1-methyl 1-ethyl propyl, 2-ethyl butyl, normal heptyl, 1,1,2,3-tetramethyl propyl, 1,2-dimethyl 1-ethyl propyl, 1,1,2-trimethyl butyl, 1-isopropyl 2-methyl propyl, 1-methyl 2-ethyl butyl, 1,1-diethyl propyl, 2-methyl hexyl, 1,1-dimethyl amyl, 1-isopropyl butyl, 1-ethyl 3-methyl butyl, 1,4-dimethyl amyl, isoheptyl, 1-methyl 1-ethyl butyl, 1-ethyl 2-methyl butyl, 1-methyl hexyl, 1-propyl butyl, normal octyl, 1-methyl heptyl, 1,1-diethyl 2-methyl propyl, 1,1,3,3-tetramethyl butyl, 1,1-diethyl butyl, 1,1-dimethyl hexyl, 1-methyl 1-ethyl amyl, 1-methyl 1-propyl butyl, 2-ethyl hexyl, 6-methyl heptyl (iso-octyl), normal nonyl, 1-methyl octyl, 1-ethyl heptyl, 1,1-dimethyl heptyl, 1-ethyl 1-propyl butyl, 1,1-diethyl 3-methyl butyl, diisobutyl methyl, 3,5,5-trimethyl hexyl, 3,5-dimethyl heptyl, normal decyl, 1-propyl heptyl, 1,1-diethyl hexyl, 1,1-dipropyl butyl, 2-isopropyl 5-methyl hexyl and $C_{11-18}$ alkyl groups.

Typical examples of substituted alkyl radicals are the haloalkyl radicals which can be represented by the structure

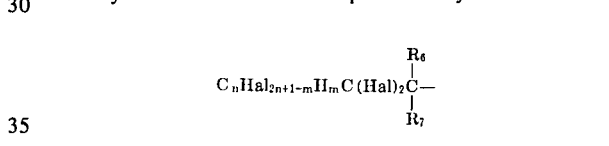

where Hal refers to a halogen, m is less than or equal to $2_{n+1}$ and n may have any value from 0 to 18, and $R_6$ and $R_7$ can be hydrogen, halogen, or alkyl radicals. Preferred radicals are those where Hal is fluoro and include those represented by the following formulas:

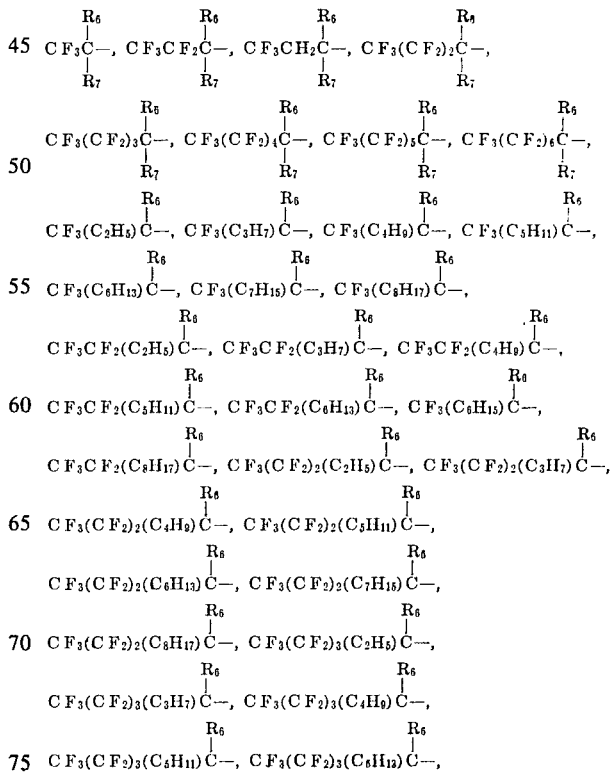

Typical examples of alkyl, aryl substituted alkyl and substituted aryl radicals are given above.

Polyesters which are suitable as base stocks are represented by the structure

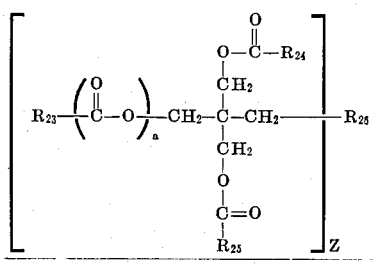

wherein $R_{23}$ is selected from the group consisting of hydrogen and alkyl, $R_{24}$ and $R_{25}$ are each selected from the group consisting of alkyl, substituted alkyl, aryl and substituted aryl, $a$ is a whole number having a value of 0 to 1, Z is a whole number having a value of 1 to 2 and when Z is 1 $R_{26}$ is selected from the group consisting of hydrogen, alkyl acyloxy and substituted acyloxy and when Z is 2 $R_{26}$ is oxygen, and are prepared by esterifying such polyalcohols as pentaerythritol, dipentaerythritol, trimethylolpropane, trimethololethane and neopentyl glycol with such acids as propionic, butyric, isobutyric, n-valeric, caproic, n-heptylic, caprylic, 2-ethylhexanoic, 2,2-dimethylheptanoic and pelargonic. Typical examples of alkyl, substituted alkyl, aryl and substituted aryl radicals are given above.

Other esters which are also suitable as base stocks are the monoesters.

Another class of base stocks which are suitable as base stocks for this invention are represented by the structure

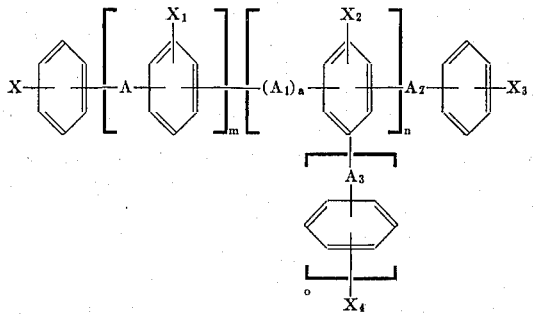

wherein A, $A_1$, $A_2$ and $A_3$ are each a chalcogen having an atomic number of 8 to 16, X, $X_1$, $X_2$, $X_3$ and $X_4$ each are selected from the group consisting of hydrogen, alkyl, haloalkyl, halogen, arylalkyl and substituted arylalky, $m$, $n$ and $o$ are whole numbers each having a value of 0 to 8 and $a$ is a whole number having a value of 0 to 1 provided that when $a$ is 0, $n$ can have a value of 1 to 2. Typical examples of alkyl and substituted alkyl radicals are given above. Typical examples of such base stocks are two- to seven-ring ortho-,meta- and para-polyphenyl ethers and mixtures thereof, two- to seven-ring ortho-, meta- and para-polyphenyl thioethers and mixtures thereof, mixed polyphenyl ether-thioether compounds in which at least one of the chalcogens represented by A, $A_1$, $A_2$ and $A_3$ is dissimilar with respect to any of the other chalcogens, dihalogenated diphenyl ethers, such as 4-bromo-3'-chlorodiphenyl ethers and bisphenoxy biphenyl compounds and mixtures thereof.

Hydrocarbon oils including mineral oils derived from petroleum sources and synthetic hydrocarbon oils are suitable base stocks. The physical characteristics of functional fluids derived from a mineral oil are selected on the basis of the requirements of the fluid systems and therefore this invention includes as base stocks mineral oils having a wide range of viscosities and volatilities such as naphthenic base, paraffinic base and mixed base mineral oils.

The synthetic hydrocarbon oils include but are not limited to those oils derived from oligomerization of olefins such as polybutenes and oils derived from high alpha olefins of from eight to 20 carbon atoms by acid catalyzed dimerization and by oligomerization using trialuminum alkyls as catalysts.

Chlorinated biphenyls are also useful as base stocks.

It is also contemplated within the scope of this invention that mixtures of two or more of the aforedescribed base stocks can be utilized as base stocks.

The fluid compositions of this invention when utilized as a functional fluid can also contain dyes, pour point depressants, antioxidants, antifoam agents, viscosity index improvers such as polyalkyl acrylates, polyalkyl methacrylates, polycyclic polymers, polyurethanes, polyalkylene oxides and polyesters, lubricity agents, water and the like.

It is also contemplated that the base stocks as aforementioned can be utilized singly or as a fluid composition containing two or more base stocks in varying proportions. The base stocks can also contain other fluids which include, in addition to the functional fluids, desired fluids derived from coal products, synthetics, and synthetic oils, e.g., alkylene polymers (such as polymers of propylene, butylene, etc., and mixtures thereof), alkylene oxide type polymers (e.g., propylene oxide polymers), and derivatives, including alkylene oxide polymers prepared by polymerizing the alkylene oxide in the presence of water or alcohol, e.g., ethyl alcohol, alkyl benzenes, (e.g., monoalkyl benzene such as dodecyl benzene, tetradecyl benzene, etc.), and dialkyl benzene (e.g., n-nonyl 2-ethyl hexyl benzene); polyphenols, (e.g., biphenyls and terphenyls), halogenated benzene, halogenated lower alkyl benzene and monohalogenated diphenyl ethers.

However, in the preferred form of the present invention, the epoxy composition of the present invention will be combined with a phosphate functional fluid base stock. The base stock will consist primarily of trialkyl phosphates being present in amounts from 50 to 90 percent by weight and preferably from 65 to 75 percent by weight. The trialkyl phosphates which give optimum results are those wherein each of the alkyl group contains from three to 12 carbon atoms, preferably from four to nine carbon atoms. The alkyl groups should be of a straight chain configuration. A single trialkyl phosphate may contain the alkyl group in all three positions or may possess a mixture of different alkyl groups. Mixtures of various trialkyl phosphates can be used. Suitable species of trialkyl phosphates which may be employed as the base stock composition include tripropyl phosphates, tributyl phosphates, trihexyl phosphates, trioctyl phosphates, dipropyl octyl phosphates, dibutyl octyl phosphates, dipropyl hexyl phosphate, dihexyl octyl phosphate, dihexyl propyl phosphate, and propyl butyl octyl phosphate.

The trialkyl phosphates can be combined with at least one triaryl phosphate which will consist of tricresyl phosphate or trixylenyl phosphate, but it is preferred that a mixture of tricresyl phosphate and trixylenyl phosphate be employed. The triaryl phosphates in this instance function as a thickener for the trialkyl phosphates. Thus, the amount of tricresyl phosphate may range between 0 and 25 percent by weight while the trixylenyl phosphate may range between 0 and 25 percent by weight. The preferred range of the triaryl phosphates will be from 5 to 15 percent tricresyl phosphate and from 5 to 15 percent by weight trixylenyl phosphate. The combined mixture of tricresyl phosphate and trixylenyl phosphate are blended together to provide a viscosity of between 145 to 230 Saybolt Universal Seconds measured at 100° F. This blend of materials can then be combined with a trialkyl phosphate in any known manner.

A conventional polymeric material is then blended with a mixture of trialkyl phosphate and triaryl phosphate material which functions as a viscosity index improver. The polymeric material suitable with the present invention can be a mixture of from 10 to 55 percent by weight polymethacrylates, polyacrylates, each containing from one to 20 carbon atoms. The polymeric materials may be within a solvent carrier such

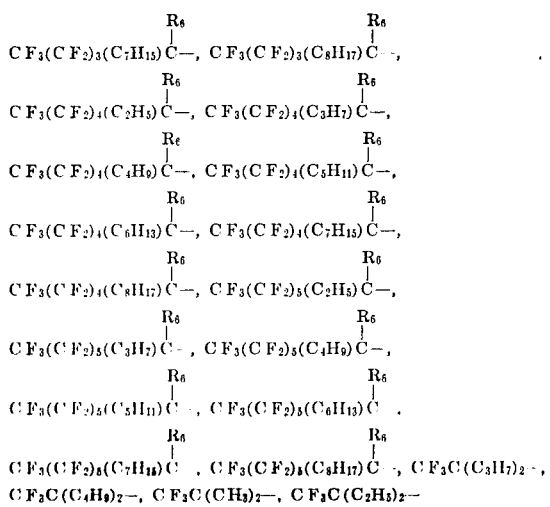

where $R_6$ and $R_7$ have their aforedescribed significance.

The halogenated alkyl radicals can be primary, secondary or tertiary.

Other suitable fluorine-containing radicals include fluorinated alkoxyalkyl radicals particularly those represented by the following formulas:

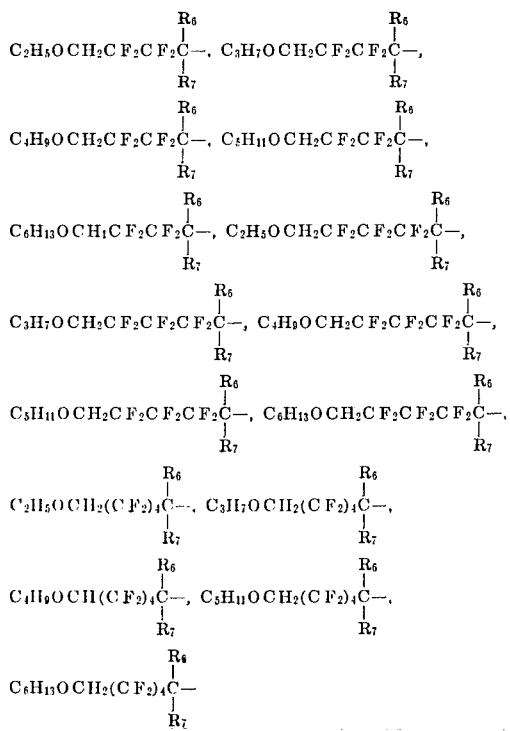

where $R_6$ and $R_7$ have their aforedescribed significance.

It is also contemplated within the scope of this invention that the hydrogen and the fluorine in the previously described haloalkyl radicals can be replaced by other halogens, such as chlorine or bromine.

Typical examples of aryl and substituted aryl radicals are phenyl, cresyl, xylyl, halogenated phenyl, cresyl and xylyl in which the available hydrogen on the aryl or substituted aryl is partially or totally replaced by a halogen, o-, m- and p-trifluoromethylphenyl, o-, m- and p-2,2,2-trifluoroethylphenyl, o-, m- and p-3,3,3-trifluoropropylphenyl and o-, m- and p-4,4,4-trifluorobutylphenyl.

The orthosilicates useful as base stocks include the tetraalkyl orthosilicates such as tetra(octyl)orthosilicates, tetra(2-ethylhexyl)orthosilicates and the tetra(isooctyl)orthosilicates and those in which the isooctyl radicals are obtained from isooctyl alcohol which is derived from the oxo process, and the (trialkoxysilico)trialkyl orthosilicates, otherwise referred to as hexa(alkoxy) disiloxanes, such as hexa(2-ethyl-butoxy) disiloxane and hexa(2-ethylhexoxy) disiloxane.

The preferred tetraalkyl orthosilicates and hexa(alkoxy) disiloxanes are those in which the alkyl or alkoxy radicals have from four to 12 carbon atoms and in which the total number of carbon atoms in the orthosilicate is from 16 to 60.

In addition to the hexa(alkoxy) disiloxanes referred to above, other hexa(alkoxy) disiloxanes can be used in which the aliphatic radical of the alkoxy groups are for example, 1-ethylpropyl, 1,3-dimethylbutyl, 2-methylpentyl, 1-methylhexyl, 1-ethylpentyl, 2-butylhexyl and 1-methyl-4-ethyloctyl.

The orthosilicates and alkoxy polysiloxanes can be represented by the general structure

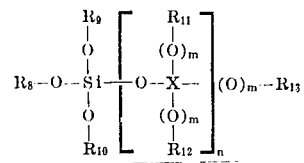

wherein $R_8$, $R_9$ and $R_{10}$ each can be alkyl, substituted alkyl, aryl, substituted aryl and can be identical or different with respect to any other radical, O is oxygen, Si is silicon, X is a member of the group consisting of carbon and silicon, m is a whole number having a value of 0 or 1, n is an integer having a value of from 1 to about 200 or more and when X is carbon m is 0, n is 1 and $R_{11}$, $R_{12}$ and $R_{13}$ each can be hydrogen, alkyl, substituted alkyl, aryl and substituted aryl radicals and when X is silicon m is 1, n is an integer having a value of from 1 to about 200 or more and $R_{11}$, $R_{12}$ and $R_{13}$ each can be alkyl, substituted alkyl, aryl and substituted aryl.

Typical examples of substituted aryl radicals are o-, m- and p-chlorophenyl, o-, m- and p-bromophenyl, o-, m- and p-fluorophenyl, $\alpha$, $\alpha,\alpha$-trichlorocresyl, $\alpha$, $\alpha,\alpha$-trifluorocresyl, xylyl and o-, m- and p-cresyl. Typical examples of alkyl and haloalkyl radicals are those heretofore described.

The siloxanes or silicones useful as base stocks are represented by the general structure

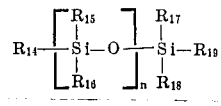

wherein $R_{14}$, $R_{15}$, $R_{16}$, $R_{17}$, $R_{18}$ and $R_{19}$ can each be alkyl, substituted alkyl, aryl and substituted aryl radicals and n is a whole number from about 0 to about 2,000 or more. Typical examples of alkyl and haloalkyl radicals are those heretofore described. Typical examples of the siloxanes are poly(methyl) siloxane, poly(methyl, phenyl) siloxane, poly(methyl, chlorophenyl)siloxane and poly(methyl, 3,3,3-trifluoropropyl)siloxane.

Typical examples of substituted aryl radicals and o-, m- and p-chlorophenyl, o-, m- and p-bromophenyl, o-, m- and p-fluorophenyl, $\alpha$, $\alpha,\alpha$-trichlorocresyl, $\alpha$, $\alpha,\alpha$-trifluorocresyl, o-, m- and p-cresyl and xylyl.

Dicarboxylic acid esters which are suitable as base stocks are represented by the structure

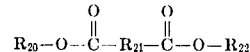

wherein $R_{20}$ and $R_{22}$ are each selected from the group consisting of alkyl, substituted alkyl, aryl and substituted aryl and $R_{21}$ is a divalent radical selected from the group consisting of alkylene and substituted alkylene, and are prepared by esterifying dicarboxylic acids as adipic acid, azelaic acid, suberic acid, sebacic acid, hydroxysuccinic acid, fumaric acid, maleic acid, etc., with alcohols such as butyl alcohol, hexyl alcohol, 2-ethylhexyl alcohol, dodecyl alcohol, 2,2-dimethyl heptanol, 1-methyl cyclohexyl methanol, etc.

as di-2-ethylhexyl sebacate, dioctyl adipate, di-2-ethyl hexyl adipate, or other conventional carriers. The polymeric materials may be any combination of these materials. This material is thoroughly blended with a combination of ingredients to form a uniform material. The amount of material incorporated therein may range between 5 and 20 percent by weight.

Thereafter, a rust inhibitor within a solvent carrier, such as an alkyl succinate acid and their derivatives, is blended with the material. This latter material can be present in amounts between 0.01 and 0.5 percent by weight. Thereafter, a corrosion inhibitor such as benzotriazole, quinizarin or the like in an amount ranging between 0.001 and 0.5 percent by weight is added to the mixture and thoroughly blended therewith. Then, a dye which may range between 5 and 20 parts per million is added thereto and blended therewith in a conventional manner. As is conventional, a silicone antifoaming agent is added thereto and can be present in an amount ranging between 5 and 50 parts per million.

It has been found and practiced that when the epoxy compositions of the present invention are blended with the above preferred functional fluid composition, the properties thereof are superior to the known commercial fluid.

The invention can be better appreciated by the following nonlimiting examples:

EXAMPLE 1

A base stock material consisting of tricresyl phosphate in an amount of 10.45 weight percent was thoroughly blended with 8.55 weight percent of trixylenyl phosphate to attain a viscosity of 155 Saybolt Universal Seconds measured at 100° F. This blend of materials was blended with 68.96 weight percent of tributyl phosphate until the materials were thoroughly intermixed. Thereafter, 12 weight percent of a mixture of about 40 percent of a polyalkyl methacrylate and about 60 percent di-2-ethyl hexyl sebacate solvent carrier were thoroughly blended therewith. A conventional alkyl succinic acid rust inhibitor in an amount of 0.02 weight percent within a solvent carrier was blended therewith. Then, 0.02 weight percent of benzotriazole was thoroughly blended therewith along with a conventional dye and antifoam agent in an amount of 10 parts per million and 15 parts per million, respectively. Thereafter, 3,4-epoxycyclohexylmethyl 3,4-epoxy-cyclohexane carboxylate was blended into the mixture at an additive level of 1.0 percent by weight. After the above ingredients were thoroughly blended together to form a homogeneous mixture of materials, the functional fluid was thoroughly tested to give the following properties:

TABLE I—TYPICAL PROPERTIES

| Appearance | Blue |
|---|---|
| Specific Gravity, 77° F./77° F. (ASTM D-287) | 1.019 |
| Viscosity, cs at 210° F. (ASTM D-445) | 3.56 |
| cs at 100° F. (ASTM D-445) | 10.87 |
| cs at −65° F. (ASTM D-445) | 2224 |
| Viscosity Index (ASTM D-567) | 219 |
| (ASTM D-2270) | 264 |
| Pour Point ° F. (ASTM D-97) | below −80 |
| Neutralization No. mg.KOH/g. (ASTM D-974) | 0.13 |
| Water, wt. % (ASTM D-1744) | 0.53 |

TABLE II—FIRE PROPERTIES

| Flash Point, ° F. | (ASTM D-92) | 370 |
|---|---|---|
| Fire Point, ° F. | (ASTM D-92) | 400 |
| Autogeneous Ignition Temperature, ° F. (ASTM D-286) | | 1000 |
| Manifold Ignition, ° F. (Fed. Test Method Std. No. 791a, Method 6053) | | 1300 |

TABLE III—HYDROLYTIC STABILITY (Fed. Test Method Std. No. 791a Method 3457)
48 Hours at 200° F.

| Metal Weight Loss, mg./sq. cm. | | −0.019 |
|---|---|---|
| Neutralization Number Change, | mg.KOH/g. | |
| | fluid | +0.12 |
| | water | +8.16 |

TABLE IV—CORROSION, HYDROLYTIC, AND OXIDATION STABILITY (Boeing Specification BMS 3-11, Section 7.5)
Metal Weight Loss, mg./sq. cm.

| Steel, QQ-S-636 | −0.007 |
|---|---|
| Steel, 4340, cadmium plated | −0.036 |
| Aluminum, QQ-A-355 | −0.014 |
| Magnesium, QQ-M-44 | −0.586 |
| Copper, QQ-C-576 | −0.051 |
| Neutralization Number Change, mg.KOH/g. | −0.01 |
| Viscosity Change, | |
| cs at 210° F. | −0.07 |
| cs at 100° F. | +0.10 |

TABLE V—SHEAR STABILITY (ASTM D-2603)
Viscosity Change, % Loss at 100° F.
Shear Time,

| 15 minutes | 4.35 |
|---|---|
| 30 minutes | 6.94 |
| 60 minutes | 10.18 |
| 120 minutes | 15.91 |

TABLE VI—FOAMING CHARACTERISTICS (ASTM D-892)

| Sequence I, 75° F. | volume, ml. | 30 |
|---|---|---|
| | collapse time, sec. | 30 |
| Sequence II, 200° F. | volume, ml. | 20 |
| | collapse time, sec. | 10 |
| Sequence III, 75° F. | volume, ml. | 30 |
| | collapse time, sec. | 30 |

TABLE VII—LUBRICITY (ASTM-2266)
a. Four Ball Wear Test
600 r.p.m. 1 hour at 167° F.

| mm. scar, 4 kg. load | 0.18 |
|---|---|
| mm. scar, 10 kg. load | 0.24 |
| mm. scar, 40 kg. load | 0.70 |

TABLE VIII—EFFECT ON ELASTOMERS a. Durometer Hardness (ASTM D-676)
Change from original, 72 hours at 160° F.

| Precision EPR Comp. No. 3128 | −14 |
|---|---|

|  |  |
|---|---|
| Precision EPT Comp. No. 3458 | −7 |
| Parker butyl B 278-7 | −19 |
| Stillman butyl SR-613-75 | −13 |
| Change from original, 672 hours at 225° F. | |
| Precision EPR Comp. No. 3128 | −22 |
| Precision EPT Comp. No. 3458 | −14 |
| Parker butyl B 278-7 | −62 |
| Stillman butyl SR-613-75 | −48 |
| b. Volumetric Swell (ASTM D-471) | |
| % Swell, 72 hours at 160° F. | |
| Precision EPR Comp. No. 3128 | 10.0 |
| Precision EPT Comp. No. 3458 | 6.90 |
| Parker butyl B 278-7 | 13.6 |
| Stillman butyl SR-613-75 | 8.76 |
| % Swell, 672 hours at 225° F. | |
| Precision EPR Comp. No. 3128 | 26.9 |
| Precision EPT Comp. No. 3458 | 17.5 |
| Parker butyl B 278-7 | 62.3 |
| Stillman butyl SR-613-75 | 42.8 |

EXAMPLE 2

A base stock material consisting of tricresyl phosphate in an amount of 10.45 weight percent was thoroughly blended with 8.55 weight percent of trixylenyl phosphate to attain a viscosity of 155 Saybolt Universal Seconds measured at 100° F. This blend of materials was blended with 68.96 weight percent of tributyl phosphate until the materials were thoroughly intermixed. Thereafter, 12 weight percent of a mixture of about 40 percent of a polyalkyl methacrylate and about 60 percent di-2-ethyl hexyl sebacate solvent carrier was thoroughly blended therewith. A conventional alkyl succinate acid rust inhibitor in an amount of 0.02 weight percent within a solvent carrier was blended therewith. Then, 0.02 weight percent of benzotriazole was thoroughly blended therewith along with a conventional dye and antifoam agent in an amount of 10 parts per million and 15 per million, respectively. After the above ingredients were thoroughly blended together to form a homogeneous mixture of materials, various additives in the form of epoxy resins in varying amounts was blended therewith. The functional fluid so formed was thoroughly tested to give the following properties:

TABLE IX—HYDROLYTIC STABILITY (ASTM−2508 48 hours at 200° F.)

| Additive | Fluid Neutralization No. Change mg.KOH/g. |
|---|---|
| None | +2.32 |
| Commercial Alkyl Epoxy Resin¹— 1.0% by wt. | +1.26 |
| Commercial bis-phenol A²— 1.0% by wt. | +1.11 |
| Commercial epoxy novolac³— 1.0% by wt. | +0.89 |
| Commercial Diglycidyl ether⁴— 0.5% by wt. | +1.05 |
| Commercial Diglycidyl ester⁵— 1.0% by wt. | +0.08 |
| Water—0.6%—by wt. | +2.14 |
| Water—0.6%; Commercial alkyl epoxy resin⁶—1.0% by wt. | +1.30 |
| Water—0.6%; Commercial Alkyl Epoxy Resin¹—1.0% by wt. | +1.34 |
| Water—0.6%; Commercial bis-phenol A²—1.0% by wt. | +1.02 |
| Water—0.6%; Commercial Diglycidyl ether⁴—1.0% by wt. | +0.79 |
| Water—0.6%; Commercial epoxy novolac³—1.0% by wt. | +0.96 |

TABLE X—REFLEX OXIDATION TEST (AMS 3150 C 168 Hours at 180° F.)

| Additive | Fluid Neutralization No. Change mg.KOH/g. |
|---|---|
| None | +0.47 |
| Commercial Diglycidyl ether⁴—1.0% by wt. | +0.05 |
| Water 0.6% by wt. | +0.43 |
| Commercial Diglycidyl ether⁴—0.5%; $H_2O$—0.6% by wt. | +0.33 |
| Commercial Diglycidyl ether⁴—1.0%; $H_2O$—0.6% by wt. | +0.09 |
| Commercial bis-phenol A²—1.0%; $H_2O$—0.6% by wt. | +0.05 |
| Commercial epoxy novolac³—1.0%; $H_2O$—0.6% by wt. | +0.26 |
| Commercial alkyl epoxy resin¹—1.0%; $H_2O$—0.6% by wt. | +0.08 |
| Commercial Diglycidyl ester⁵—1.0%; $H_2O$—0.6% by wt. | +0.01 |
| Water—1.0%; Commercial alkyl epoxy resin⁶—$H_2O$—0.6% by wt. | +0.17 |
| Commercial alkyl epoxy resin¹—0.5%; $H_2O$—0.6% by wt. | +0.09 |

TABLE XI—REFLEX OXIDATION TEST (Fed. Test Method No. 791a Method 5308.5 168 Hours at 250° F.)

| Additive | Fluid Neutralization No. Change mg.KOH/g. |
|---|---|
| Water—0.6% wt. % | +0.27 |
| Commercial bis-phenol A²—1.0%; $H_2O$—0.6% wt. | −0.08 |
| Commercial epoxy novolac³—1.040; $H_2O$—0.6% wt. % | −0.16 |
| Commercial Diglycidyl ester⁵—1.0%; $H_2O$—0.6% wt. % | −0.13 |

TABLE XII—THERMAL STABILITY (Fed. Test Method No. 991a Method 2508 24 hours at 400° F.)

| Additive | Neutralization No. Change mg.KOH/g. |
|---|---|
| None | +5.05 |
| Commercial alkyl epoxy resin⁷—0.5 wt. % | +3.65 |
| Commercial alkyl epoxy resin⁶ | +3.44 |
| Commercial alkyl epoxy resin⁶ | +3.07 |
| Commercial alkyl epoxy resin¹—0.5 wt. % | +3.71 |
| Commercial alkyl epoxy resin¹—1.0% wt. % | +2.88 |
| Commercial alkyl epoxy resin⁹—0.5% wt. % | +3.95 |
| Commercial bis-phenol A²—0.5 wt. % | +3.73 |
| Commercial bis-phenol A²—1.0 wt. % | +2.61 |
| Commercial epoxy novolac³—0.5 wt. % | +3.50 |
| Commercial epoxy novolac³—1.0 wt. % | +2.24 |
| Commercial Diglycidyl ether⁴—0.5 wt. % | +3.74 |
| Commercial Diglycidyl ether⁴—1.0 wt. % | +1.63 |
| Commercial Diglycidyl ester⁵—1.0 wt. % | +3.32 |

¹Sold by Proctor and Gamble Company under the trademark EPOXIDE 8.

²Sold by Shell Chemical Company under the trademark EPON 820.

³Sold by Dow Chemical Company under the trademark DEN 431.

⁴Sold by Ciba Products Company under the trademark ERE 1359.

⁵Sold by Union Carbide Corporation under the trademark UNOX EPOXIDE 221.

⁶Sold by Proctor and Gamble under the trademark EPOXIDE 44.

⁷Sold by Argus Chemical Company under the trademark DRAPEX 44.

⁸Sold by Swift and Company under the trademark EPOXOL 9-5.

What is claimed is:

1. An aircraft hydraulic fluid comprising a base stock material selected from the group consisting of esters of an acid of phosphorus, amides of an acid of phosphorus and mixtures thereof, and from about 0.1 to about 10 percent by weight of a 3,4-epoxycycloalkyl 3,4-epoxycycloalkyl carboxylate.

2. The composition of claim 1 in which said carboxylate comprises 3,4-epoxycyclohexylmethyl 3,4-epoxycyclohexane carboxylate.

3. The composition of claim 1 in which said carboxylate is present from between about 0.1 to about 5 weight percent.

4. The composition of claim 1 containing a viscosity index improver selected from the group consisting of polymethacrylates, polyacrylates and mixtures thereof.

5. The composition of claim 1 which contains an alkyl succinate rust inhibitor.

6. The composition of claim 1 containing a dye and an antifoaming agent.

7. The composition of claim 1 containing a corrosion inhibitor selected from the group consisting of benzotriazole and quinizarin.

8. The composition of claim 7 in which said corrosion inhibitor is benzotriazole.

9. The composition of claim 1 in which said base stock comprises an ester of an acid of phosphorus.

10. The composition of claim 9 in which said ester of an acid of phosphorus is a trialkyl phosphate.

11. The composition of claim 9 wherein said ester of an acid of phosphorus is a mixture of trialkyl phosphates and triaryl phosphates.

12. The composition of claim 11 in which said trialkyl phosphates are present in an amount ranging between about 50 and about 90 percent by weight and the triaryl phosphates are present in an amount up to 50 percent by weight.

13. The composition of claim 9 wherein said ester of an acid of phosphorus comprises a mixture of a trialkyl phosphate and an ester selected from the group consisting of alkyl diaryl phosphate and dialkyl aryl phosphate.

14. A method for controlling acid buildup in an aircraft hydraulic fluid comprising a base stock selected from the group consisting of esters of an acid of phosphorus, amides of an acid of phosphorus and mixtures thereof which comprises incorporating in said hydraulic fluid from between about 0.1 to about 10 percent by weight of a 3,4-epoxycycloalkyl 3,4-epoxycycloalkyl carboxylate.

15. The method of claim 14 in which said carboxylate comprises 3,4-epoxycyclohexylmethyl 3,4-epoxycyclohexane carboxylate.

* * * * *